(12) United States Patent
Border et al.

(10) Patent No.: US 8,131,823 B2
(45) Date of Patent: Mar. 6, 2012

(54) SYSTEM AND METHOD FOR READING AHEAD OF CONTENT

(75) Inventors: John Border, Poolesville, MD (US);
Douglas Dillon, Gaithersburg, MD (US);
Matthew Butehorn, Mt. Airy, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 1975 days.

(21) Appl. No.: 09/996,445

(22) Filed: Nov. 28, 2001

(65) Prior Publication Data

US 2002/0055966 A1 May 9, 2002

Related U.S. Application Data

(63) Continuation-in-part of application No. 09/708,134, filed on Nov. 8, 2000.

(51) Int. Cl.
*G06F 15/16* (2006.01)
(52) U.S. Cl. .................. 709/219; 709/217
(58) Field of Classification Search .......... 709/217, 709/218, 219
See application file for complete search history.

(56) References Cited

U.S. PATENT DOCUMENTS

| | | | | |
|---|---|---|---|---|
| 6,249,804 B1* | 6/2001 | Lam | ........... | 709/203 |
| 6,249,914 B1* | 6/2001 | Harrison et al. | ........... | 725/141 |
| 6,266,701 B1* | 7/2001 | Sridhar et al. | ........... | 709/232 |
| 6,282,542 B1* | 8/2001 | Carneal et al. | ........... | 707/10 |
| 6,330,561 B1* | 12/2001 | Cohen et al. | ........... | 707/10 |
| 6,393,526 B1* | 5/2002 | Crow et al. | ........... | 711/137 |
| 6,401,125 B1* | 6/2002 | Makarios et al. | ........... | 709/229 |
| 6,427,172 B1* | 7/2002 | Thacker et al. | ........... | 709/235 |
| 6,463,447 B2* | 10/2002 | Marks et al. | ........... | 715/513 |
| 6,553,393 B1* | 4/2003 | Eilbott et al. | ........... | 715/513 |
| 6,598,048 B2* | 7/2003 | Carneal et al. | ........... | 707/10 |
| 6,658,463 B1* | 12/2003 | Dillon et al. | ........... | 709/219 |
| 6,751,608 B1* | 6/2004 | Cohen et al. | ........... | 707/3 |
| 6,795,848 B1* | 9/2004 | Border et al. | ........... | 709/213 |
| 2002/0010761 A1* | 1/2002 | Carneal et al. | ........... | 709/219 |
| 2003/0051100 A1* | 3/2003 | Patel | ........... | 711/118 |

OTHER PUBLICATIONS

Quantum Prime Communications, "Information on VSATS", May 8, 1999, Web Page, Retreived from http://web.archive.org/web/19990508072748/http://www.qpcomm.com/vsat_info.html on Jan. 5, 2004.*
Netscape, "Persistent Client State HTTP Cookies", 1999, Available at: http://wp.netscape.com/newsref/std/cookie_spec.html.*

* cited by examiner

*Primary Examiner* — Aaron Strange
(74) *Attorney, Agent, or Firm* — Ditthavong Mori & Steiner, P.C.

(57) ABSTRACT

A communication system for retrieving content stored in a content server (e.g., web server) is disclosed. The system includes a client that is configured to transmit a message requesting content specifying an object from a content server. The system also includes a plurality of proxy servers that include a downstream proxy server and an upstream proxy server. The downstream proxy server is configured to communicate with the client. The upstream proxy server is configured to retrieve the content from the content server and to forward information associated with the object over a data network to the downstream proxy server prior to the client transmitting another message requesting the object. The above arrangement has particular application to a wide area network, such as a satellite network.

21 Claims, 9 Drawing Sheets

SYSTEM AND METHOD FOR READING AHEAD OF CONTENT

CROSS-REFERENCES TO RELATED APPLICATION

This application is a Continuation-In-Part of co-pending U.S. patent application Ser. No. 09/708,134, filed Nov. 8, 2000, entitled "System and Method of Reading Ahead of Objects for Delivery to an HTTP Proxy Server"; the entirety of which is incorporated herein by reference.

BACKGROUND OF THE INVENTION

1. Field of the Invention

The present invention relates to a communication system, and is more particularly related to retrieving web content using proxy servers.

2. Discussion of the Background

As businesses and society, in general, become increasingly reliant on communication networks to conduct a variety of activities, ranging from business transactions to personal entertainment, these communication networks continue to experience greater and greater delay, stemming in part from traffic congestion and network latency. For example, the maturity of electronic commerce and acceptance of the Internet, in particular the World Wide Web ("Web"), as a daily tool pose an enormous challenge to communication engineers to develop techniques to reduce network latency and user response times. With the advances in processing power of desktop computers, the average user has grown accustomed to sophisticated applications (e.g., streaming video, radio broadcasts, video games, etc.), which place tremendous strain on network resources. The Web as well as other Internet services rely on protocols and networking architectures that offer great flexibility and robustness; however, such infrastructure may be inefficient in transporting Web traffic, which can result in large user response time, particularly if the traffic has to traverse an intermediary network with a relatively large latency (e.g., a satellite network).

FIG. 9 is a diagram of a conventional communication system for providing retrieval of web content by a personal computer (PC). PC 901 is loaded with a web browser 903 to access the web pages that are resident on web server 905; collectively the web pages and web server 905 denote a "web site." PC 903 connects to a wide area network (WAN) 907, which is linked to the Internet 909. The above arrangement is typical of a business environment, whereby the PC 901 is networked to the Internet 909. A residential user, in contrast, normally has a dial-up connection (not shown) to the Internet 909 for access to the Web. The phenomenal growth of the Web is attributable to the ease and standardized manner of "creating" a web page, which can possess textual, audio, and video content.

Web pages are formatted according to the Hypertext Markup Language (HTML) standard which provides for the display of high-quality text (including control over the location, size, color and font for the text), the display of graphics within the page and the "linking" from one page to another, possibly stored on a different web server. Each HTML document, graphic image, video clip or other individual piece of content is identified, that is, addressed, by an Internet address, referred to as a Uniform Resource Locator (URL). As used herein, a "URL" may refer to an address of an individual piece of web content (HTML document, image, sound-clip, video-clip, etc.) or the individual piece of content addressed by the URL. When a distinction is required, the term "URL address" refers to the URL itself while the terms "web content", "URL content" or "URL object" refers to the content addressed by the URL.

In a typical transaction, the user enters or specifies a URL to the web browser 903, which in turn requests a URL from the web server 905 using the HyperText Transfer Protocol (HTTP). The web server 905 returns an HTML page, which contains numerous embedded objects (i.e., web content), to the web browser 903. Upon receiving the HTML page, the web browser 903 parses the page to retrieve each embedded object. The retrieval process requires the establishment of separate communication sessions (e.g., TCP (Transmission Control Protocol) connections) to the web server 905. That is, after an embedded object is received, the TCP connection is torn down and another TCP connection is established for the next object. Given the richness of the content of web pages, it is not uncommon for a web page to possess over 30 embedded objects. This arrangement disadvantageously consumes network resources, but more significantly, introduces delay to the user.

Delay is further increased if the WAN 907 is a satellite network, as the network latency of the satellite network is conventionally a longer latency than terrestrial networks. In addition, because HTTP utilizes a separate TCP connection for each transaction, the large number of transactions amplifies the network latency. Further, the manner in which frames are created and images are embedded in HTML requires a separate HTTP transaction for every frame and URL compounds the delay.

Based on the foregoing, there is a clear need for improved approaches for retrieval of web content within a communication system.

There is a need to utilize standard protocols to avoid development costs and provide rapid industry acceptance.

There is also a need for a web content retrieval mechanism that makes the networks with relatively large latency viable and/or competitive for Internet access.

Therefore, an approach for retrieving web content that reduces user response times is highly desirable.

SUMMARY OF THE INVENTION

According to one aspect of the invention, a communication system for retrieving web content comprises a downstream proxy server that is configured to receive a URL request message from a web browser. The URL request message specifies a URL content that has an embedded object. An upstream proxy server is configured to communicate with the downstream proxy server and to receive the URL request message from the downstream proxy server. The upstream proxy server selectively forwards the URL request message to a web server and receives the URL content from the web server. The upstream proxy server forwards the URL content, along with information about the objects (e.g., an Expected Objects List) to the downstream proxy server and parses the URL content to obtain the embedded object prior to receiving a corresponding embedded object request message initiated by the web browser. The above arrangement advantageously reduces user response time associated with web browsing.

According to one aspect of the present invention, a communication system includes a client that is configured to transmit a message requesting content specifying an object from a content server. The system also includes a plurality of proxy servers that include a downstream proxy server and an upstream proxy server. The downstream proxy server is configured to communicate with the client. The upstream proxy server is configured to retrieve the content from the content server and to forward information associated with the object over a data network to the downstream proxy server prior to the client transmitting another message requesting the object.

In another aspect of the present invention, a method of providing content to a client is provided. The method includes retrieving the content specifying an object. Additionally, the method includes forwarding information associated with the object to a downstream server prior to the client transmitting a message requesting the object.

In another aspect of the present invention, a network device includes means for retrieving content specifying an object from a content server. The network device also includes means for forwarding information associated with the object to a downstream server prior to the client transmitting a message requesting the object.

In yet another aspect of the present invention, a computer-readable medium carrying one or more sequences of one or more instructions for providing content to a client is disclosed. The one or more sequences of one or more instructions including instructions which, when executed by one or more processors, cause the one or more processors to perform the step of retrieving the content specifying an object. Another step includes forwarding information associated with the object to a downstream server prior to the client transmitting a message requesting the object.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention provides a communication system for retrieving web content. A downstream proxy server receives a URL request message from a web browser, in which the URL request message specifies a URL content that has an embedded object. An upstream proxy server receives the URL request message from the downstream proxy server. The upstream proxy server selectively forwards the URL request message to a web server and receives the URL content from the web server. The upstream proxy server forwards the URL content to the downstream proxy server and parses the URL content to obtain the embedded object prior to receiving a corresponding embedded object request message initiated by the web browser.

Although the present invention is discussed with respect to protocols and interfaces to support communication with the Internet, the present invention has applicability to any protocols and interfaces to support a packet switched network, in general.

Figure 1:
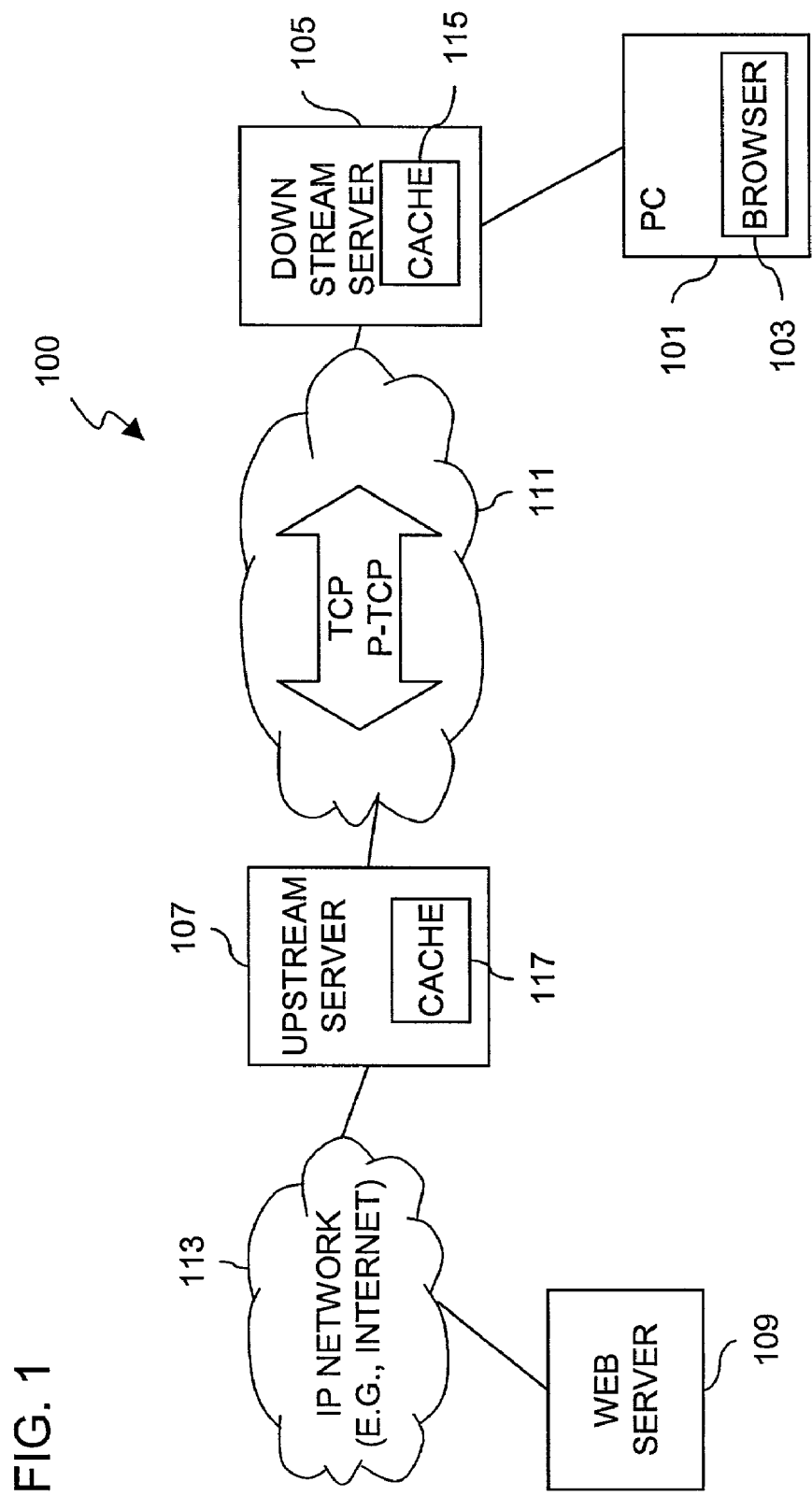
FIG. 1 is a diagram of a communication system employing a downstream proxy server and an upstream proxy server for accessing a web server, according to an embodiment of the present invention.

FIG. 1 shows a diagram of a communication system employing a downstream proxy server and an upstream proxy server for accessing a web server, according to an embodiment of the present invention. Communication system 100 includes a user station 101 that utilizes a standard web browser 103 (e.g., Microsoft Internet Explorer, Netscape Navigator). In this example, the user station 101 is a personal computer (PC); however, any computing platform may be utilized, such as a workstation, web enabled set-top boxes, web appliances, etc. System 100 utilizes two proxy servers 105 and 107, which are referred to as a downstream proxy server 105 and an upstream proxy server 107, respectively. As used herein, the terms "upstream" and "downstream" refer to the flow of content from a content server (i.e., web server 109) to the client. PC 101 connects to downstream server 105, which communicates with upstream server 107 through a network 111. According to an embodiment of the present invention, the network 111 is a VSAT (Very Small Aperture Terminal) satellite network. Alternatively, the network 111 may be any type of Wide Area Network (WAN); e.g., ATM (Asynchronous Transfer Mode) network, router-based network, T1 network, etc. The upstream server 107 has connectivity to an IP network 113, such as the Internet, to access web server 109.

Proxy servers 105 and 107, according to an embodiment of the present invention, are HTTP proxy servers with HTTP caches 115 and 117, respectively. The downstream and upstream proxy servers 105 and 107 communicate using Transmission Control Protocol (TCP) connections, in which multiple TCP connections may be used to support parallel HTTP transactions. Or the servers 105 and 107 may communicate using persistent connections. It is noted that support for persistent connections may be provided by HTTP 1.1. Use of persistent connections enables a single TCP connection to be reused for multiple requests of the embedded objects within a web page associated with web server 109. Additionally, the TCP Transaction Multiplexing Protocol (TTMP) may be utilized to further enhance network efficiencies. TTMP and persistent-TCP are more fully described with respect to FIG. 5.

Web browser 103 may be configured to either access URLs directly from a web server 109 or from HTTP proxy servers 105 and 107. A web page may refer to various source documents by indicating the associated URLs. As discussed above, a URL specifies an address of an "object" in the Internet 113 by explicitly indicating the method of accessing the resource. A representative format of a URL is as follows: http://www.hns.com/homepage/document.html. This example indicates that the file "document.html" is accessed using HTTP.

HTTP proxy servers 105 and 107 act as intermediaries between one or more browsers and many web servers (e.g., web server 109). A web browser 103 requests a URL from the proxy server (e.g., 105) which in turn "gets" the URL from the addressed web server 109. Alternatively, web browser 103 may send its requests directly to web server 109 with HTTP proxy server 105 "transparently" intercepting and acting upon such requests. An HTTP proxy 105 itself may be configured to either access URLs directly from a web server 109 or from another HTTP proxy server 107.

The operation of system 100 in the retrieval of web content, according to an embodiment of the present invention, is described in FIG. 2, below.

Figure 2:
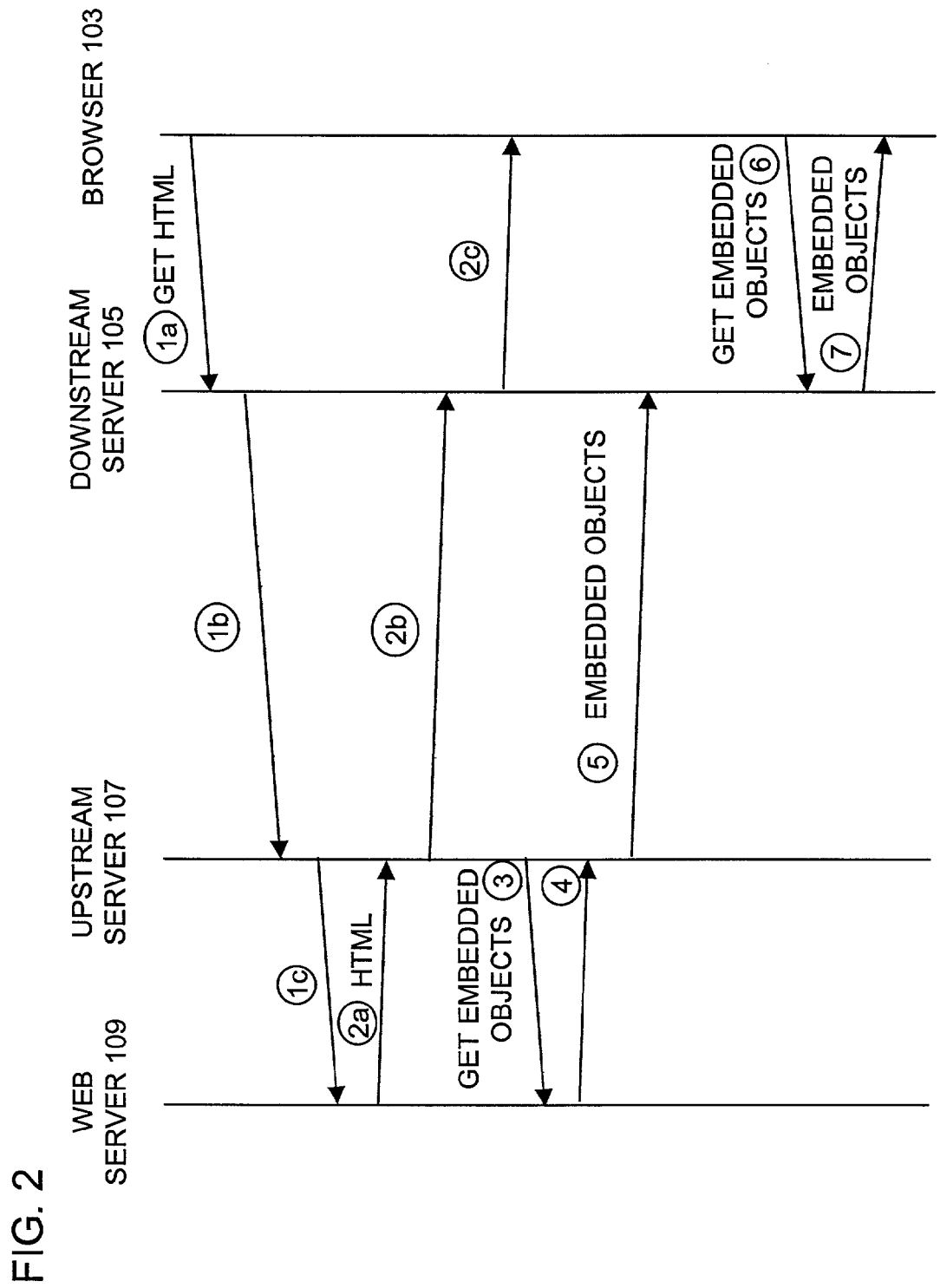
FIG. 2 is a sequence diagram of the process of reading ahead used in the system of FIG. 1.

FIG. 2 shows a sequence diagram of the process of reading ahead used in the system of FIG. 1. In steps 1a-1c, to retrieve a web page (i.e., HTML page) from web server 109, the web browser 103 on PC 101 issues an HTTP GET request. It is observed that the HTTP protocol also supports a GET IF MODIFIED SINCE request wherein a web server (or a proxy server) either responds with a status code indicating that the URL has not changed or with the URL content if the URL has changed since the requested date and time. For the purposes of explanation, the HTML page is addressed as URL "HTML." When the GET request is received, the downstream server 105 checks its cache 115 to determine whether the requested URL has been previously visited. If the downstream proxy server 105 does not have URL HTML stored in cache 115, the server 105 relays this request, GET URL "HTML", to upstream server 107.

The upstream server 107 in turn searches for the URL HTML in its cache 117; if the HTML page is not found in cache 117, the server 107 issues the GET URL HTML request to the web server 109 for the HTML page. Next, in steps 2a-2c, the web server 109 transmits the requested HTML page to the upstream server 107, which stores the received HTML page in cache 117. The upstream server 107 forwards the HTML page to the downstream server 105, and ultimately to the web browser 103. The HTML page is stored in cache 115 of the downstream server 105 as well as the web browser's cache (not shown). In step 3, the upstream server 107 parses the HTML page and requests the embedded objects within the HTML page from the web server 109; the embedded objects are requested prior to receiving corresponding embedded object requests initiated by the web browser 103. Although FIG. 2 shows steps 2a-2c, and 3 in sequence, the upstream server 107 can perform steps 2b and 3 in parallel.

Step 3 may involve the issuance of multiple GET requests; the web page within web server 109 may, for example, contain over 30 embedded objects, thus requiring 30 GET requests. In effect, this scheme provides a way to "read ahead" (i.e., retrieve the embedded object) in anticipation of corresponding requests by the web browser 103. The determination to read-ahead may be based upon explicit tracking of the content of the downstream server cache 115, in which only those embedded objects that are not found in the cache 115 are requested. Alternatively, the upstream server 107 may only request those embedded objects that are not in the upstream server cache 117. Further, in actual implementation with multiple web servers, the upstream server 107 may track which web servers tend to transmit uncacheable objects; for such servers, objects stored therein are read-ahead. In another approach, upstream server 107 may examine the URLs of the embedded objects and decide whether to read-ahead an object based on characteristics of the URL. For example, the inclusion of a question mark in the URL generally indicates that the object will not be cacheable.

Moreover if the HTML contains a cookie and the GET HTML request is directed to the same web server, then the upstream server 107 includes the cookie in the read-ahead requests to the web server 109 for the embedded objects. A cookie is information that a web server 109 stores on the client system, e.g., PC 101, to identify the client system. Cookies provide a way for the web server 109 to return customized web pages to the PC 101. Under such a scenario, the upstream server 107 provides an indication whether the embedded objects has the corresponding cookie.

In step 4, the web server 109 honors the GET requests by transmitting the embedded objects to the upstream server 107. The upstream server 107, as in step 5, then forwards the retrieved objects to the downstream server 105, where the objects are stored until they are requested by the web browser 103. It should be noted that the upstream server 107 forwards the embedded objects prior to being requested to do so by the web browser 103; however, the upstream server 107 performs this forwarding step based on an established criteria. There are scenarios in which all the embedded objects that are read-ahead may not subsequently be requested by the web browser 103. In such cases, if the upstream server 107 transfers these embedded objects over network 111 to the downstream server 105, the bandwidth of network 111 would be wasted, along with the resources of the downstream server 105. Accordingly, the forwarding criteria need to reflect the trade off between response time and bandwidth utilization.

These forwarding criteria may include the following: (1) object size, and (2) "cacheability." That is, upstream server 107 may only forward objects that are of a predetermined size or less, so that large objects (which occupy greater bandwidth) are not sent to the downstream server 105. Additionally, if the embedded object is marked uncacheable, then the object may be forwarded to the downstream server 105, which by definition will not have the object stored. The upstream server 107 may be configured to forward every retrieved embedded object, if bandwidth is not a major concern. Or, upstream server 107 may apply configurable rules to decide which objects to forward. For example, upstream server 107 may examine the HTTP headers of the objects and forward objects which have a short time to live since such objects, while cacheable, are less likely to still be fresh in the downstream server cache 115.

In step 6, the web browser 103 issues a GET request for the embedded objects corresponding to the web page within the web server 109. The downstream server 105 recognizes that the requested embedded objects are stored within its cache 115 and forwards the embedded objects to the web browser 103. Under this approach, the delays associated with network 111 and the Internet 113 are advantageously avoided.

The caching HTTP proxy servers 105 and 107, according to one embodiment of the present invention, store the most frequently accessed URLs. When web server 109 delivers a URL to the proxy servers 105 and 107, the web server 109 may deliver along with the URL an indication of whether the URL should not be cached and an indication of when the URL was last modified. At this point, web browser 103 has already requested URL HTML, and has the URL HTML stored in a cache (not shown) of the PC 101. To avoid stale information, if web browser 103 needs to get the web page again, the web browser 103 determines whether the information stored at URL HTML has been updated since the time it was last requested. As previously mentioned, the browser 103 may issue a GET IF MODIFIED SINCE the last time HTML was obtained. Assuming that URL HTML, for example, was obtained at 11:30 a.m. on Sep. 22, 2000, browser 103 issues a GET IF MODIFIED SINCE Sep. 22, 2000 at 11:30 a.m. request. This request is sent to downstream proxy server 105. If downstream proxy server 105 has received an updated version of URL HTML since Sep. 22, 2000 at 11:30 a.m., downstream proxy server 105 supplies the new URL HTML information to the browser 103; step 2c of FIG. 2 occurs after step 1a, thereby avoiding steps 1b, 1c, 2a and 2b. When web browser 103 requests the embedded objects in URL HTML, whereby downstream proxy 105 does not have the objects in its cache 115, the requests for these objects must be forwarded to upstream proxy 107—this is not shown in FIG. 2.

If downstream proxy 105 has not received an updated URL HTML since Sep. 22, 2000 at 11:30 a.m., the downstream proxy server 105 issues a GET IF MODIFIED SINCE command to upstream proxy server 107. If upstream proxy server 107 has received an updated URL HTML since Sep. 22, 2000 at 11:30 a.m., upstream proxy server 107 passes the new URL HTML to the downstream proxy server 105. (In FIG. 2, step 2b occurs after step 1b, skipping steps 1c and 2a.) In addition, upstream proxy server 107 may invoke the read-ahead function (step 3) as if it had received the URL HTML from web server 109.

If upstream proxy server 107 has not received an updated URL HTML since Sep. 22, 2000 at 11:30 a.m., the upstream proxy server 107 issues a GET HTML IF MODIFIED SINCE command to the web server 109. If URL HTML has not changed since Sep. 22, 2000 at 11:30 a.m., web server 109 issues a NO CHANGE response to the upstream proxy server 107. If URL HTML has changed, the web server 109 responds with the new URL HTML. At this point, upstream proxy 107 processes it in the same manner as for the original request, forwarding the URL HTML to the downstream proxy 105 (step 2) and performing the read-ahead function (step 3). Under this arrangement, bandwidth and processing time are saved, because if the URL HTML has not been modified since the last request, the entire contents of URL HTML need not be transferred between web browser 103, downstream proxy server 105, upstream proxy server 107, and the web server 109; only an indication that there has been no change need be exchanged. But, if URL HTML has been modified, the read-ahead function is still invoked.

Upstream proxy server 107 supports the ability to deliver the original URL HTML and the embedded objects to the downstream proxy server 105 using multicast. The use of multicast allows the upstream proxy 107 to deliver the URL HTML and the embedded objects to additional downstream proxy servers 305 and not just to the downstream proxy 105 that requested the web page. The additional downstream proxies 305 store the URL HTML and the embedded objects in their caches to be subsequently served if another user requests the web page.

Figure 3:
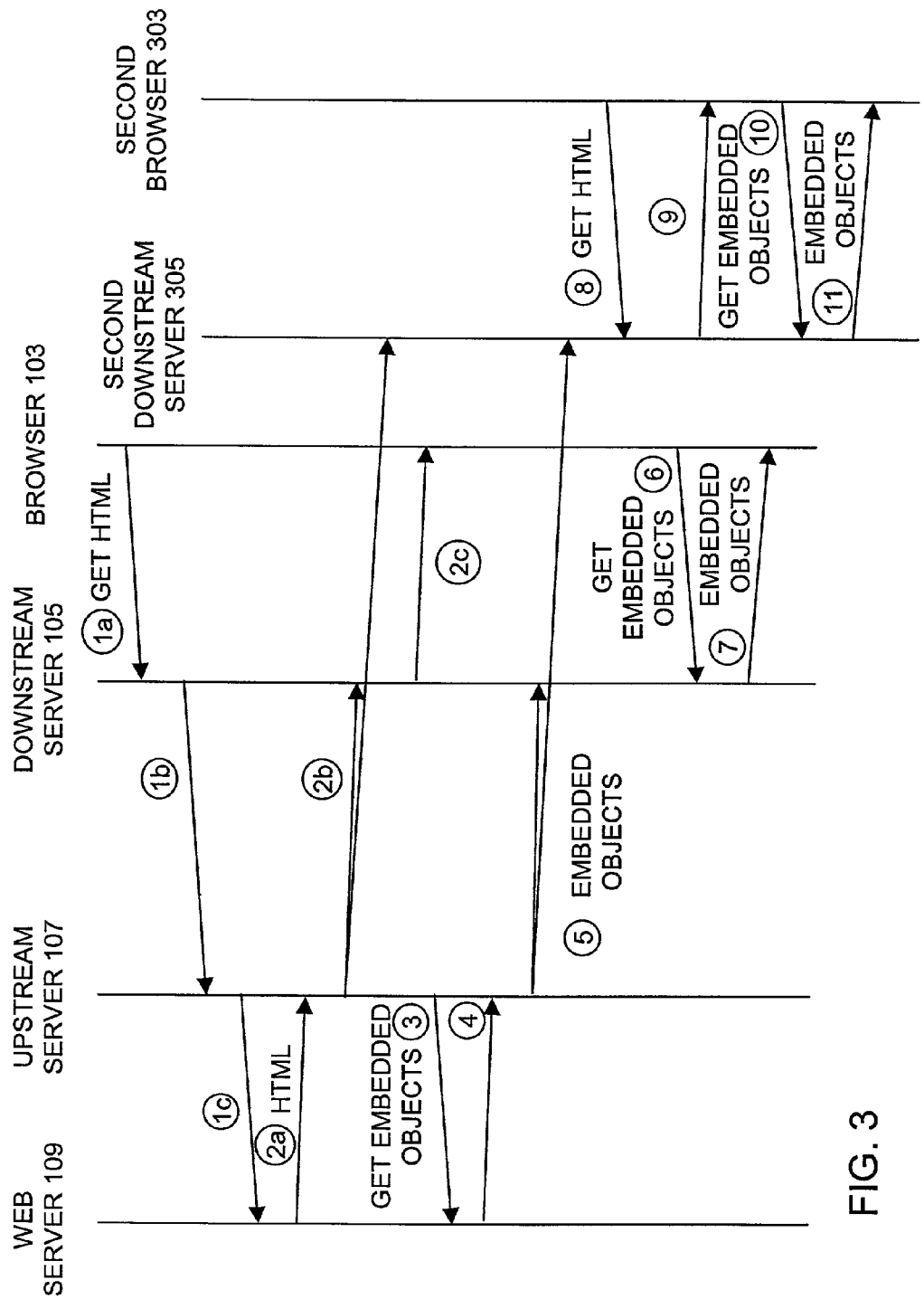
FIG. 3 is a sequence diagram of the process of reading ahead used in the system of FIG. 1, in which multicasting is used by the upstream proxy server to deliver web content to multiple downstream proxy servers.

FIG. 3 illustrates the use of multicast delivery with respect to the read-ahead mechanism, according to an embodiment of the present invention. Steps 1a-1c and 2a are performed as in the read-ahead process described in FIG. 2. At step 2b, rather than send the URL HTML to only downstream proxy 105 using a TCP connection, upstream proxy 107 sends the URL HTML to both downstream proxy 105 and downstream proxy 305 using multicast. Similarly, the embedded objects sent in step 5 are also sent to both downstream proxy 105 and downstream proxy 305 using multicast. In both cases, downstream proxy 305 stores the received objects in its cache. At step 8, web browser 303 sends a request URL HTML to downstream proxy 305. Since downstream proxy 305 has URL HTML in its cache, it is able to respond with URL HTML (step 9) without forwarding the request to upstream proxy 107. Similarly, when web browser 303 subsequently requests the embedded objects in URL HTML at step 10, downstream proxy 305 is able to respond with the objects (step 11) without forwarding the request to upstream proxy 107.

When web browser 103 receives URL HTML, the web browser 103 may request the embedded objects before they arrive at downstream proxy 105. If this occurs, unless downstream proxy 105 is aware that upstream proxy 107 is in the process of reading ahead the embedded objects, downstream proxy 105 will forward the requests for the embedded objects to upstream proxy 107. This wastes bandwidth and, unless upstream proxy 107 correlates these requests as being the same requests which it is reading ahead, the upstream proxy will respond to these requests, resulting in bandwidth being wasted in the other direction in order to deliver the objects twice.

Figure 4:
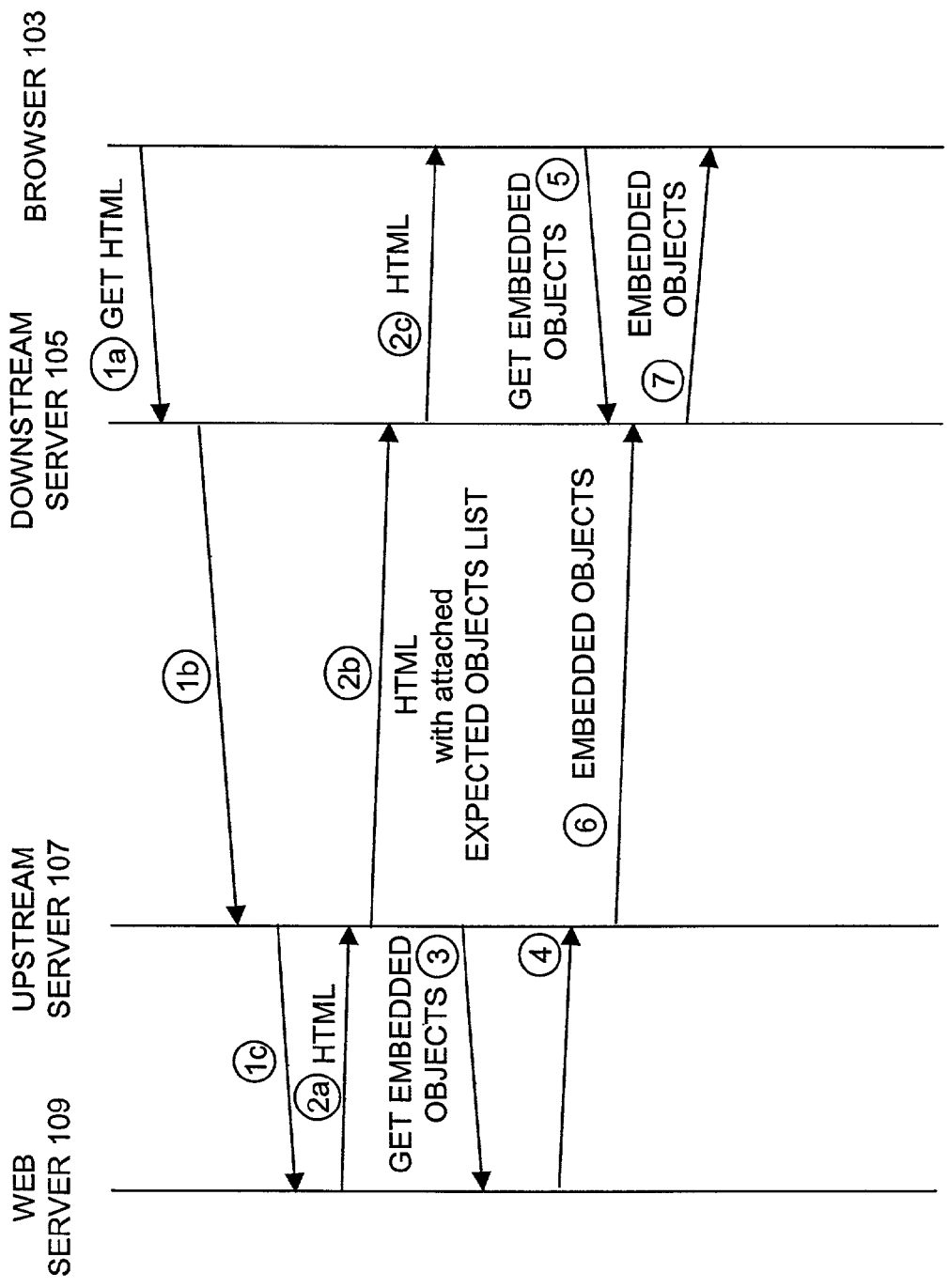
FIG. 4 is a sequence diagram of the process of reading ahead used in the system of FIG. 1, in which the request for embedded objects arrives at the downstream proxy server before the read-ahead mechanism delivers the embedded objects to the downstream proxy server.

To prevent this from occurring, in accordance with an embodiment of the present invention, upstream proxy 107, when it decides to read ahead to retrieve the embedded objects, sends a notification (i.e. an "expect" message) to downstream proxy 105 listing the objects which it will read ahead. This is illustrated in FIG. 4. In this process, steps 1a-1c, and 2a are executed as in the process of FIG. 2. In this case, at step 2b, upstream proxy 107 sends an "Expected Objects" list (e.g., Expected URL Object table) to downstream proxy 105 along with URL HTML. The "Expected Objects" list may be sent separately or, in the preferred embodiment, (to eliminate all possibility of requests for the embedded objects arriving before the "Expected Objects" message) attached to URL HTML. Downstream proxy 105 stores the "Expected Objects" list until it has received the object. When sent attached to URL HTML, downstream proxy 105 removes the attached list before forwarding URL HTML to web browser 103 in step 2c. If downstream proxy 105 receives the requests for the embedded objects from web browser 103 before it has received the objects (step 5), downstream proxy 105 examines its Expected Objects List. If the requested objects are in the list, downstream proxy 105 does not forward the requests to upstream proxy 107; the downstream proxy 105 simply marks the objects in the list as having already been requested. When the embedded objects arrive from upstream proxy 107 (step 6), downstream proxy 105 examines its Expected Objects List and, for each object that is marked as having already been requested, forwards the object to web browser 103 (step 7).

Caching proxy servers 105 and 107 offer both reduced network utilization and reduced response time when they are able to satisfy requests with cached URLs as well as reduce response time when they are not able to do so by reading ahead to retrieve embedded objects.

Figure 5:
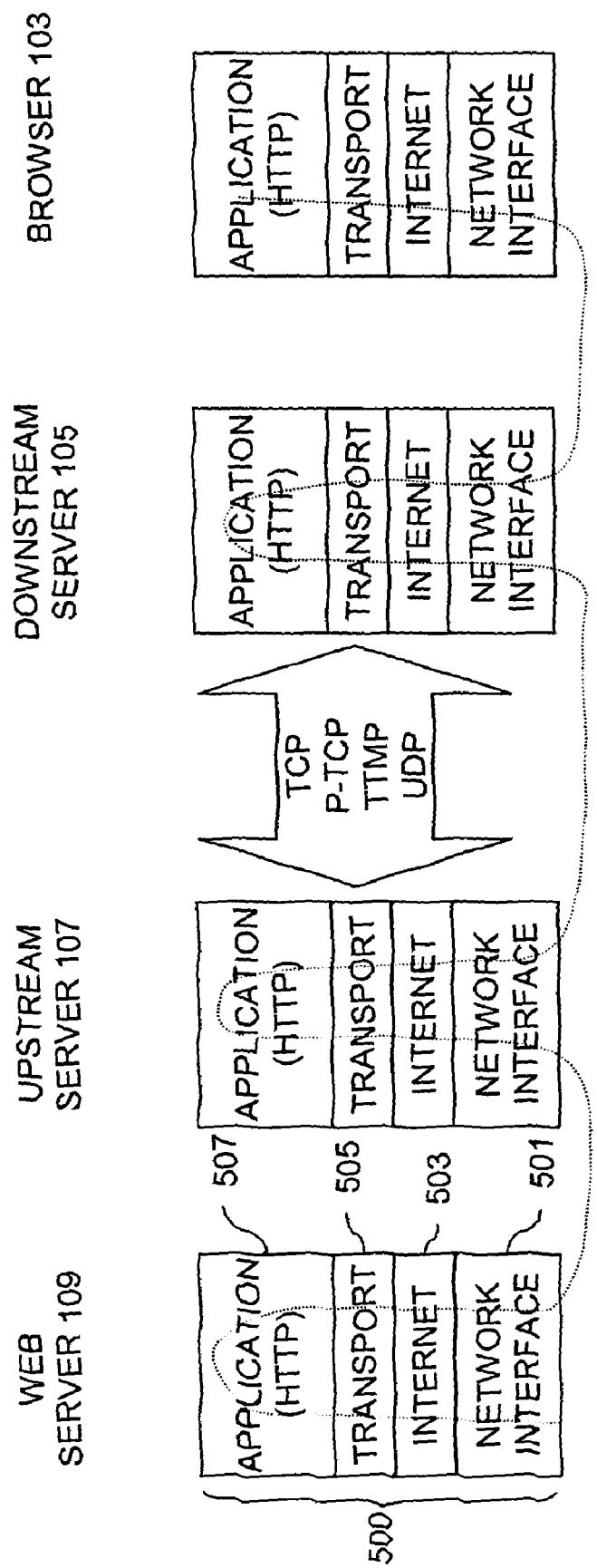
FIG. 5 is a block diagram of the protocols utilized in the system of FIG. 1.

FIG. 5 shows a block diagram of the protocols utilized in the system of FIG. 1.

The servers 105, 107, and 109 and PC 101 employ, according to one embodiment of the present invention, a layered protocol stack 500. The protocol stack 500 includes a network interface layer 501, an Internet layer 503, a transport layer 505, and an application layer 507.

HTTP is an application level protocol that is employed for information transfer over the Web. RFC (Request for Comments) 2616 specifies this protocol and is incorporated herein in its entirety. In addition, a more detailed definition of URL can be found in RFC 1737, which is incorporated herein in its entirety.

The Internet layer 503 may be the Internet Protocol (IP) version 4 or 6, for instance. The transport layer 505 may include the TCP (Transmission Control Protocol) and the UDP (User Datagram Protocol). As discussed previously, HTTP is carried on top of TCP connections with multiple TCP connections used in parallel to allow multiple HTTP transactions to occur in parallel. According to one embodiment of the present invention, at the transport layer, persistent TCP connections are utilized in the system 100; in addition, the TCP Transaction Multiplexing Protocol (TTMP) may be used. These options, as described below, provide optimized alternatives to the use of parallel TCP connections. Optionally, UDP may be used to carry HTTP requests and responses. UDP is used (on top of IP multicast) when multicast delivery is used to deliver embedded objects.

Persistent TCP (P-TCP) connections are TCP connections that are established when the first HTTP transaction is initiated and then are not torn down until the last HTTP transaction completes. While a P-TCP connection is open, it may be used to carry many HTTP transactions. A P-TCP connection can be used to carry one HTTP transaction at a time (e.g., HTTP 1.0) or pipelined HTTP transactions (e.g., HTTP 1.1). The use of P-TCP connections minimizes the impact that TCP connection establishment has on the overall response time seen by the user when downloading a web page.

The TCP Transaction Multiplexing Protocol (TTMP) provides improved performance over P-TCP connections by providing additional features. TTMP allows multiple transactions, in this case, HTTP transactions, to be multiplexed onto one TCP connection. Thus, transaction multiplexing provides an improvement over separate connections for each transaction (HTTP 1.0) by preventing a single stalled request from stalling other requests. HTTP pipelining (e.g., as supported by HTTP 1.1) can only be used if both web browser 103 and web server 109 support this functionality—this capability introduces issues of interoperability and standardization.

TTMP, used between downstream proxy 105 and upstream proxy 107, provides equivalent functionality to pipelining. And, because TTMP operates between downstream proxy 105 and upstream proxy 107, TTMP provides this capability independent from the TCP connections used between downstream proxy 105 and web browser 103 and the TCP connections used between upstream proxy 107 and web server 109. This is particularly beneficial when the downstream proxy server 105 is supporting simultaneous requests from multiple browsers (of which only browser 103 is shown in FIG. 1).

The downstream proxy server 105 initiates and maintains a TCP connection to the upstream proxy server 107 as needed to carry HTTP transactions. The TCP connection could be set up and kept connected as long as the downstream proxy server 105 is running and connected to the network 111. The persistent TCP connection may also be set up when the first transaction is required and torn down after the connection has been idle for some period.

An HTTP transaction begins with a request header, optionally followed by request content which is sent from the downstream proxy server 105 to the upstream proxy server 107. An HTTP transaction concludes with a response header, optionally followed by response content. The downstream proxy server 105 maintains a transaction ID sequence number, which is incremented with each transaction. The downstream proxy server 105 breaks the transaction request into one or more blocks, creates a TTMP header for each block, and sends the blocks with a TTMP header to the upstream proxy server 107. The upstream proxy server 107 similarly breaks a transaction response into blocks and sends the blocks with a TTMP header to the downstream proxy server 105. The TTMP header contains the information necessary for the upstream proxy server 107 to reassemble a complete transaction command and to return the matching transaction response.

In particular, the TTMP header contains the following fields: a transaction identification (ID) field, a Block Length field, a Last Indication field, an Abort Indication field, and a Compression Information field. The transaction ID (i.e., the transaction sequence number) must rollover less frequently than the maximum number of supported outstanding transactions. The Block Length field allows a proxy server 105 and 107 to determine the beginning and ending of each block. The Last Indication field allows the proxy server 105 and 107 to determine when the end of a transaction response has been received. The Abort Indication field allows the proxy server 105 and 107 to abort a transaction when the transaction request or response cannot be completed. Lastly, the Compression Information field defines how to decompress the block.

The use of a single TCP connection reduces the number of TCP acknowledgements that are sent over the network 111. Reduction in the number of TCP acknowledgements significantly reduces the use of inbound networking resources which is particularly important when the network 111 is a VSAT system or other wireless systems. This reduction of acknowledgements is more significant when techniques, such as those described in U.S. Pat. No. 5,995,725 to Dillon entitled "Method and Apparatus for Requesting and Retrieving Information for a Source Computer Using Terrestrial and Satellite Interface" issued Nov. 30, 1999 (which is incorporated herein in its entirety), minimize the number of TCP acknowledgements per second per TCP connection.

Alternatively, downstream proxy server 105, for efficiency, may use the User Datagram Protocol (UDP) to transmit HTTP GET and GET IF MODIFIED SINCE requests to the upstream proxy server 107. This is performed by placing the HTTP request header into the UDP payload. And, if this done, upstream proxy server 107 may, in turn, use UDP to transmit HTTP responses to downstream proxy server 105. This option is particularly useful in sending short responses. The use of UDP is very efficient as the overhead of establishing, maintaining and clearing TCP connections is not incurred. However, UDP is "best effort" in that there is no guarantee that the UDP packets will be delivered. In addition to the optional use of UDP described above, UDP is used by the upstream proxy server 107 when it sends HTTP responses via IP multicast in order to deliver objects to multiple downstream proxies servers 105 (and 305).

Figure 6:
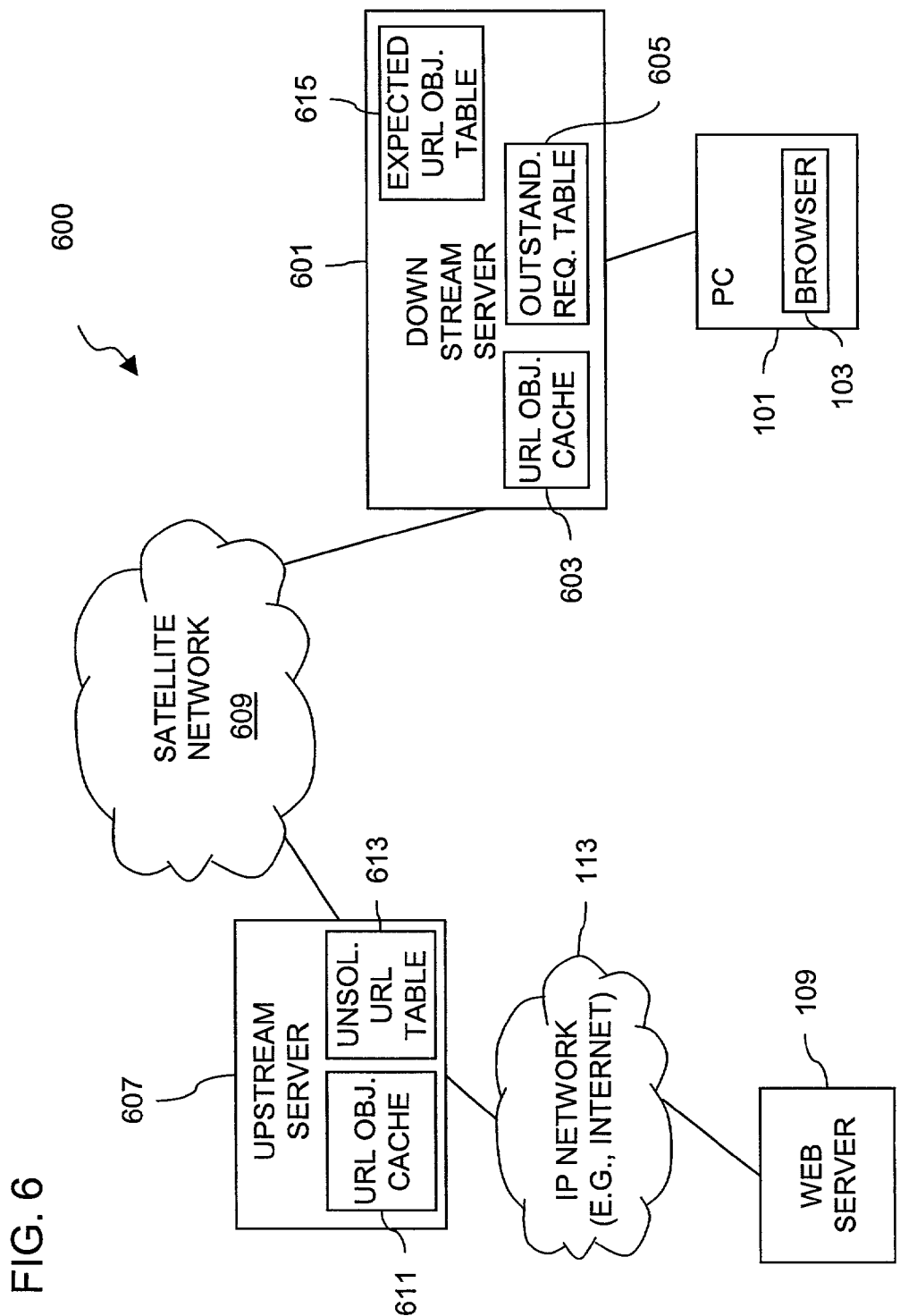
FIG. 6 is a diagram of a communication system employing a downstream proxy server and an upstream proxy server for accessing a web server, according to an embodiment of the present invention.

FIG. 6 shows a diagram of a communication system 600 employing a downstream proxy server and an upstream proxy server for accessing a web server. Communication system 600 employs a downstream server 601 that utilizes a cache 603 to store URL objects (i.e., embedded objects) as well as an Outstanding Request table 605 and an Expected URL Object table 615. The Outstanding Request table 605 tracks the URL requests that the downstream server 601 has forwarded to upstream server 607. The Expected URL Object table 615 tracks objects that are expected from upstream server 607 based on notifications received from upstream server 607. The table 615 is also used to store GET requests for expected objects received from web browser 103 before they arrive from upstream server 607. In an embodiment of the present invention, the downstream server 601 and the upstream server 607 communicate over a satellite network 609. Communication system 600 also employs an upstream server 607. The upstream server 607 may maintain a URL object cache 611 for storing the embedded objects that are retrieved from web server 109. The upstream server 607 uses an Unsolicited URL table 613, which stores the URL requests for embedded objects in advance of the web browser 103 initiating such requests. The above arrangement advantageously enhances system performance.

Figure 7:
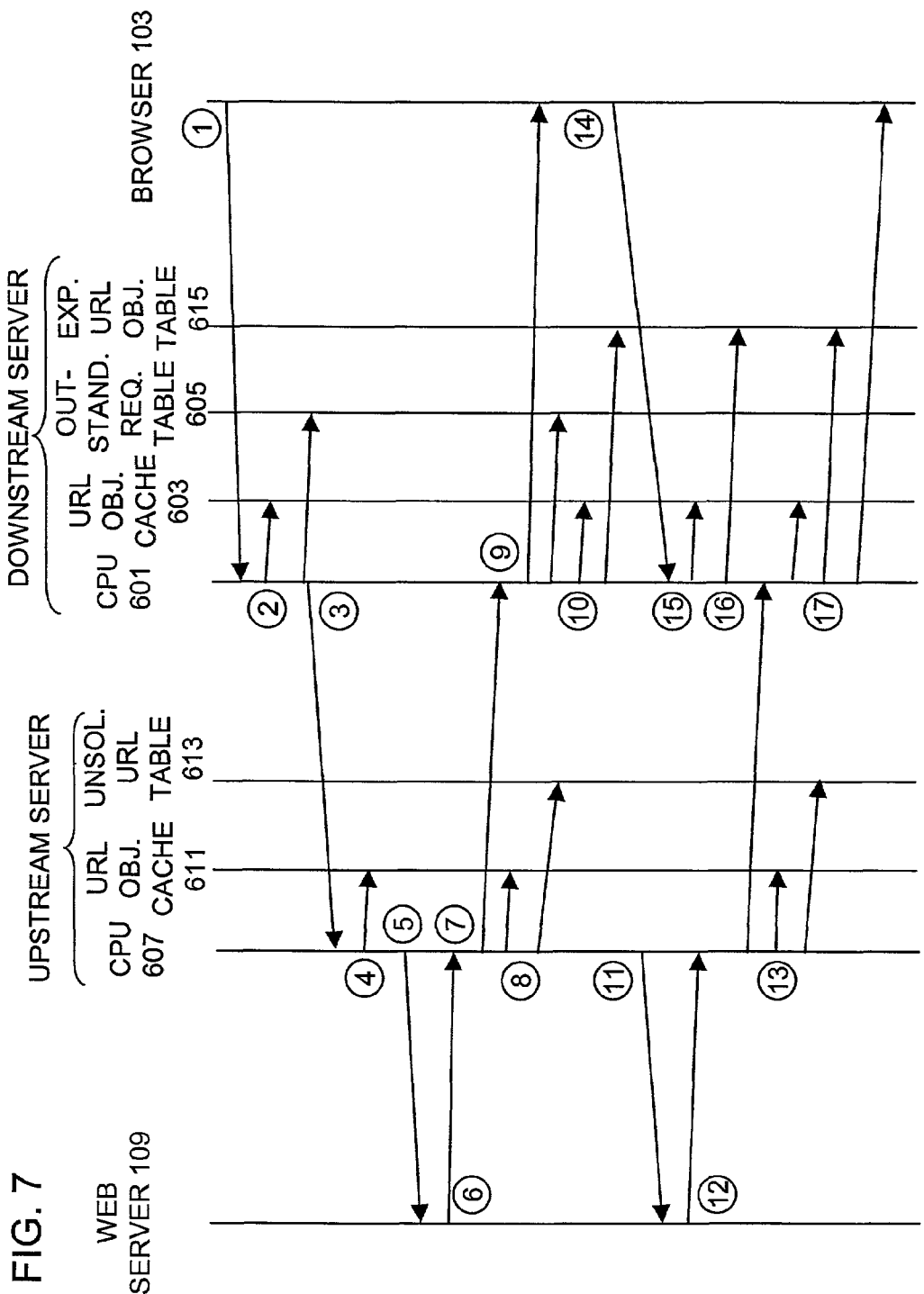
FIG. 7 is a sequence diagram of the process of reading ahead used in the system of FIG. 6.

FIG. 7 is a sequence diagram of the process of reading ahead used in the system of FIG. 6. In step 1, the web browser 103 sends a GET request (e.g., GET x.html) to the downstream server 601. The downstream server 601 checks the URL object cache 603 (step 2) to determine whether x.html is stored in the URL object cache 603; if the content is stored in cache 603, the downstream server 601 forwards the content to the browser 103. Otherwise, the downstream server 601 writes the request in the Outstanding Request table 605 and sends the GET request to the upstream server 607 (step 3). In this case, the web browser 103 and the downstream server 601 have not encountered the requested HTML page before. However, in the event that the web browser 103 has requested this HTML page in the past or the downstream server 601 has stored this HTML previously, the latest time stamp is passed to the upstream server as a conditional GET request (e.g., GET IF MODIFIED SINCE Sep. 22, 2000). In this manner, only content that is more updated than the time stamp are retrieved. In step 4, the upstream server 607 checks the URL object cache 611 in response to the received GET x.html request. Assuming x.html is not found in the URL object cache 611, the upstream server 607 forwards the GET x.html request to the web server 109, per step 5. Accordingly, the web server 109, as in step 6, returns the web page to the upstream server 607. In turn, the upstream server 607 forwards the web page to the downstream server 601, as in step 7, and stores the web page in the URL object cache 611, per step 8 (if the web page is cacheable). Prior to forwarding the web page to the downstream server 601, the upstream server 607 parses the web page to determine this list of embedded objects that it will read ahead, based upon the read-ahead criteria that were discussed with respect to FIG. 2. An Expected Objects List is then attached to the web page when it is forwarded and the list is stored in the Unsolicited URL table 613. In step 9, the downstream server 601 removes the attached "Expected These Objects" list and sends the received web page to the web browser 103. At this time, the downstream server 601 deletes the corresponding entry in the Outstanding Request table 605, stores the received web page in the URL object cache 603 (if the web page is cacheable) and stores the list of expected objects in the Expected URL Objects table 615 (step 10).

Concurrent with steps 7 and 8, the upstream server 607 requests ("reads ahead") the embedded objects of the web page using a series of GET embedded object requests (step 11). In step 12, the web server 109 returns the embedded objects to the upstream server 607. The upstream server 607 forwards the embedded objects to the downstream server 601 based on a forwarding criteria (as previously discussed with respect to FIG. 2), removes the embedded object's entry from the Unsolicited URL table 613 and also stores these embedded objects in the URL object cache 613 (if they are cacheable) (step 13). If the embedded object arrives at downstream server 601 prior to a request to for the object arriving from web browser 103, downstream server 601 will store the object in the URL object cache 603 and remove the entry for the object from the Expected URL Object table 615. Downstream server 601 will store all of the embedded objects in the URL object cache 603, even if they are not cacheable, in order to save them for when web browser 103 requests them. Uncacheable objects placed in the cache 603 for this purpose are removed from the cache 603 once they have been sent to web browser 103. In the case of FIG. 7, however, the embedded object arrives at downstream server 601 after the web browser 103 has requested it, as described below.

In parallel (or concurrently) with the reading ahead of the embedded objects, the web browser 103 (in step 14) parses the x.HTML page and issues a series of GET embedded objects requests. However, for explanatory purposes, FIG. 7 shows a single transaction for step 14. In step 15, the downstream server 601 checks its URL object cache 603 for the requested embedded object. In the case illustrated, the particular object has not arrived and is not stored in cache 603. Downstream server 601 then checks its Expected URL Object table 615 to check if the request object is being read ahead by upstream server 607 (step 16). Because the requested object is in the table, the downstream server simply stores the GET request in the table 615 to await the arrival of the read ahead object. The GET request is not forwarded to upstream proxy 607. In step 17, the embedded object arrives at downstream server 601. Downstream server 601 checks its Expected URL Object table 615 to determine whether it has already received a request for the object. Finding an entry in the table 615 for the embedded object, downstream server 601 removes the entry from the table 615 and forwards the object to web browser 103. If the object is cacheable, downstream server 601 also stores it in its object cache 603. As indicated above, if web browser 103 has not yet requested the object (as indicated in the Expected URL Object table 615), downstream server 601 will store the object in the object cache 603 even if it is uncacheable.

Under the above approach, the effects of network latencies associated with satellite network 609 and the Internet 113 are minimized, in that the web browser 103 receives the requested embedded object without having to wait for the full processing and transmission time associated with its GET embedded object request.

Figure 8:
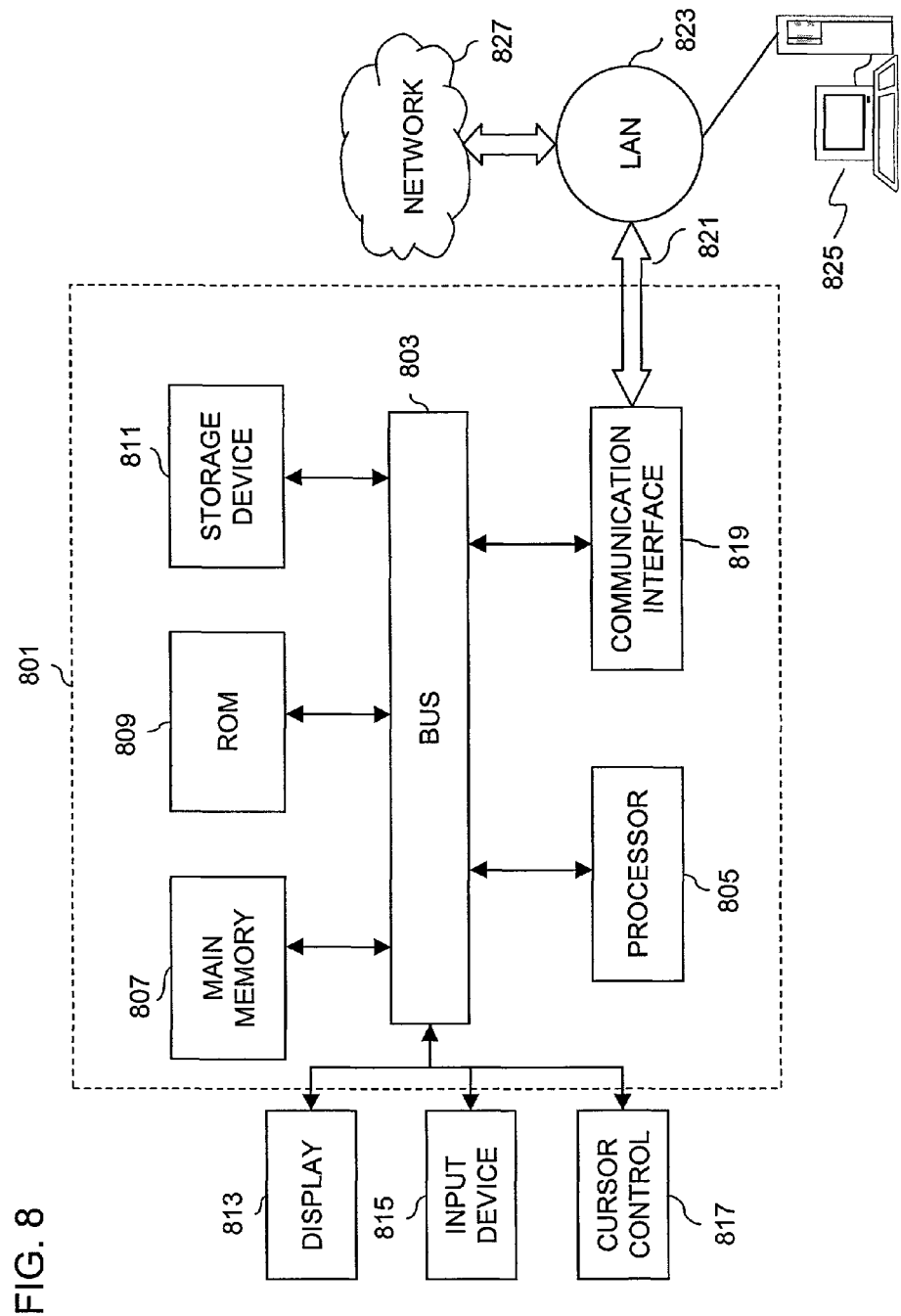
FIG. 8 is a diagram of a computer system that can be configured as a proxy server, in accordance with an embodiment of the present invention.
Figure 9:
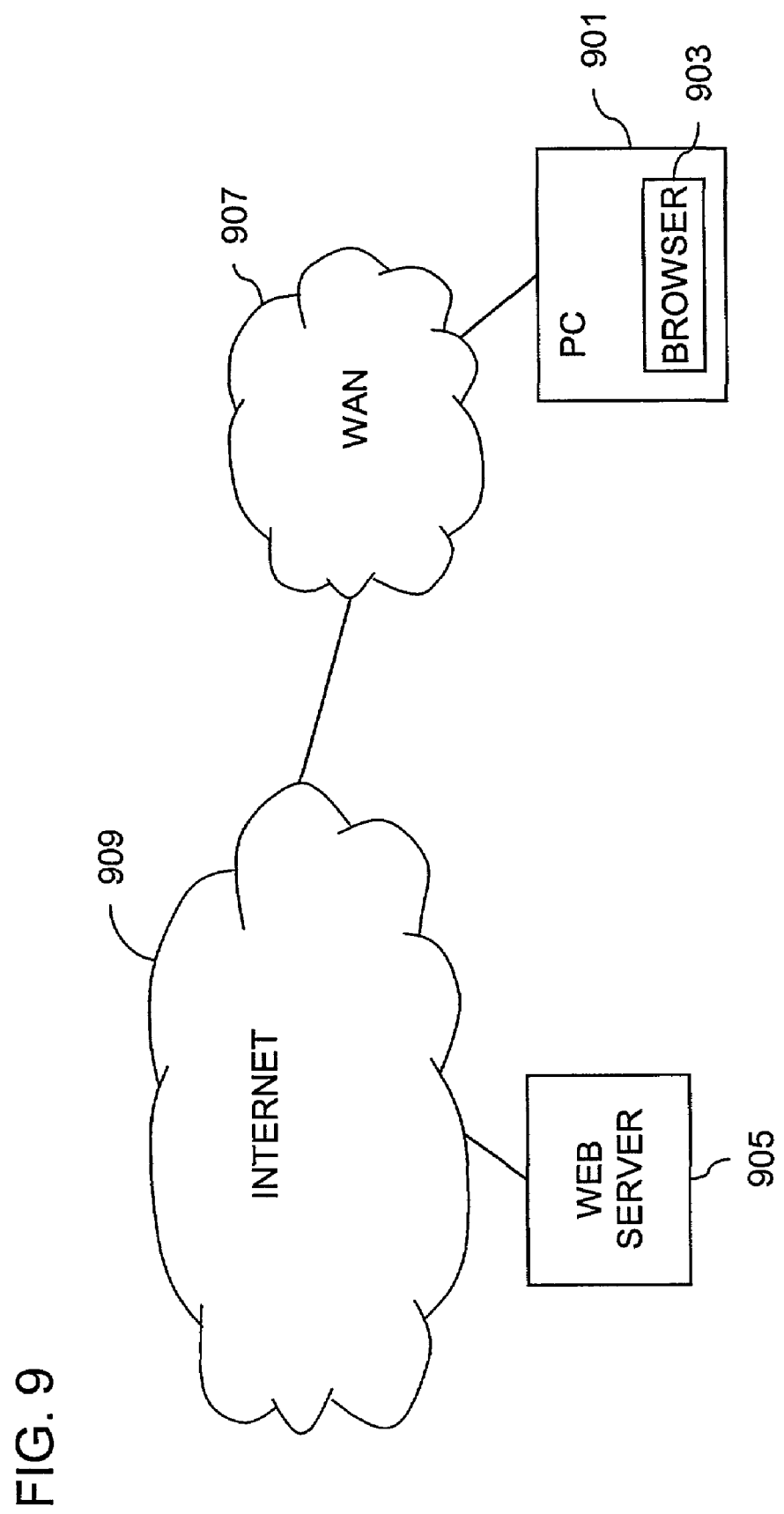
FIG. 9 is a diagram of a conventional communication system for providing retrieval of web content by a personal computer (PC).

FIG. 8 is a diagram of a computer system that can be configured as a proxy server, in accordance with an embodiment of the present invention. Computer system 801 includes a bus 803 or other communication mechanism for communicating information, and a processor 805 coupled with bus 803 for processing the information. Computer system 801 also includes a main memory 807, such as a random access memory (RAM) or other dynamic storage device, coupled to bus 803 for storing information and instructions to be executed by processor 805. In addition, main memory 807 may be used for storing temporary variables or other intermediate information during execution of instructions to be executed by processor 805. Computer system 801 further includes a read only memory (ROM) 809 or other static storage device coupled to bus 803 for storing static information and instructions for processor 805. A storage device 811, such as a magnetic disk or optical disk, is provided and coupled to bus 803 for storing information and instructions. For example, the storage device 811 (e.g., disk drive, hard drive, etc.) may store the tables utilized by the proxy servers 601 and 607 of the system of FIG. 6.

Computer system 801 may be coupled via bus 803 to a display 813, such as a cathode ray tube (CRT), for displaying information to a computer user. An input device 815, including alphanumeric and other keys, is coupled to bus 803 for communicating information and command selections to processor 805. Another type of user input device is cursor control 817, such as a mouse, a trackball, or cursor direction keys for communicating direction information and command selections to processor 805 and for controlling cursor movement on display 813.

According to one embodiment, interaction within system 100 is provided by computer system 801 in response to processor 805 executing one or more sequences of one or more instructions contained in main memory 807. Such instructions may be read into main memory 807 from another computer-readable medium, such as storage device 811. Execution of the sequences of instructions contained in main memory 807 causes processor 805 to perform the process steps described herein. One or more processors in a multi-processing arrangement may also be employed to execute the sequences of instructions contained in main memory 807. In alternative embodiments, hard-wired circuitry may be used in place of or in combination with software instructions. Thus, embodiments are not limited to any specific combination of hardware circuitry and software.

Further, the instructions to support the system interfaces and protocols of system 100 may reside on a computer-readable medium. The term "computer-readable medium" as used herein refers to any medium that participates in providing instructions to processor 805 for execution. Such a medium may take many forms, including but not limited to, non-volatile media, volatile media, and transmission media. Non-volatile media includes, for example, optical or magnetic disks, such as storage device 811. Volatile media includes dynamic memory, such as main memory 807. Transmission media includes coaxial cables, copper wire and fiber optics, including the wires that comprise bus 803. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 805 for execution. For example, the instructions may initially be carried on a magnetic disk of a remote computer. The remote computer can load the instructions relating to the issuance of read-ahead requests remotely into its dynamic memory and send the instructions over a telephone line using a modem. A modem local to computer system 801 can receive the data on the telephone line and use an infrared transmitter to convert the data to an infrared signal. An infrared detector coupled to bus 803 can receive the data carried in the infrared signal and place the data on bus 803. Bus 803 carries the data to main memory 807, from which processor 805 retrieves and executes the instructions. The instructions received by main memory 807 may optionally be stored on storage device 811 either before or after execution by processor 805.

Computer system 801 also includes a communication interface 819 coupled to bus 803. Communication interface 819 provides a two-way data communication coupling to a network link 821 that is connected to a local network 823. For example, communication interface 819 may be a network interface card to attach to any packet switched local area network (LAN). As another example, communication interface 819 may be an asymmetrical digital subscriber line (ADSL) card, an integrated services digital network (ISDN) card or a modem to provide a data communication connection to a corresponding type of telephone line. Wireless links (e.g., VSAT communications links) may also be implemented. In any such implementation, communication interface 819 sends and receives electrical, electromagnetic or optical signals that carry digital data streams representing various types of information.

Network link 821 typically provides data communication through one or more networks to other data devices. For example, network link 821 may provide a connection through local network 823 to a host computer 825 or to data equipment operated by a service provider, which provides data communication services through a communication network 827 (e.g., the Internet). LAN 823 and network 827 both use electrical, electromagnetic or optical signals that carry digital data streams. The signals through the various networks and the signals on network link 821 and through communication interface 819, which carry the digital data to and from computer system 801, are exemplary forms of carrier waves transporting the information. Computer system 801 can transmit notifications and receive data, including program code, through the network(s), network link 821 and communication interface 819.

The techniques described herein provide several advantages over prior approaches to retrieving web pages. A downstream proxy server is configured to receive a URL request message from a web browser, wherein the URL request message specifies a URL content that has an embedded object. An upstream proxy server is configured to communicate with the downstream proxy server and to receive the URL request message from the downstream proxy server. The upstream proxy server selectively forwards the URL request message to a web server and receives the URL content from the web server. The upstream proxy server forwards the URL content, along with information about the objects (e.g., an Expected Objects List) to the downstream proxy server and parses the URL content to obtain the embedded object prior to receiving a corresponding embedded object request message initiated by the web browser. This approach advantageously improves user response time.

Obviously, numerous modifications and variations of the present invention are possible in light of the above teachings. It is therefore to be understood that within the scope of the appended claims, the invention may be practiced otherwise than as specifically described herein.

What is claimed is:

1. A communication system comprising:
    a downstream proxy server configured to communicate with a client that is configured to transmit a message requesting content including an Hypertext Markup Language (HTML) page specifying an object from a content server, wherein the message includes a cookie associated with the client; and
    an upstream proxy server configured to include the cookie in a read-ahead request if the cookie is supported by the content server, to retrieve the object, based on the cookie, from the content server and to forward the object based on a predetermined criteria relating to the object, including time-to-live of the object and the object being marked as uncacheable, over a data network to the downstream proxy server prior to the client transmitting another message requesting the object.

2. A system according to claim 1, wherein the downstream proxy server and the upstream proxy server communicate over a communications link that includes at least one of plurality of Transmission Control Protocol (TCP) connections to support parallel Hypertext Transfer Protocol (HTTP) transactions, and a multiplexed connection of HTTP transactions.

3. A system according to claim 1, wherein the data network includes at least one of a Very Small Aperture Terminal (VSAT) satellite network, and a terrestrial wide area network (WAN).

4. A system according to claim 1, further comprising:
other downstream proxy servers in communication with the upstream proxy server, the upstream proxy server multicasting the object to the downstream proxy servers over the data network.

5. A method of providing content to a client, the method comprising:
receiving a message, forwarded by a downstream server, from the client;
determining whether the message includes a cookie associated with the client;
including the cookie in a read-ahead request if the cookie is supported by a content server;
retrieving the content including an Hypertext Markup Language (HTML) page specifying an object based on the read-ahead request and the cookie; and
forwarding the object over a communications link to the downstream server based on a predetermined criteria relating to the object, wherein the predetermined criteria includes time-to-live of the object and the object being marked as uncacheable, prior to the client transmitting a message requesting the object.

6. A method according to claim 5, wherein the communications link in the transmitting step includes at least one of plurality of Transmission Control Protocol (TCP) connections to support parallel Hypertext Transfer Protocol (HTTP) transactions, and a multiplexed connection of HTTP transactions.

7. A method according to claim 5, wherein the communications link in the transmitting step is established over a data network that includes at least one of a Very Small Aperture Terminal (VSAT) satellite network, and a terrestrial wide area network (WAN).

8. A method according to claim 5, further comprising:
retrieving the object; and
multicasting the object to the downstream server.

9. A method according to claim 5, further comprising:
forwarding a list specifying expected objects corresponding to the content, wherein the downstream server blocks requests from the client for objects on the list.

10. A method according to claim 5, wherein the downstream server explicitly tracks objects stored in a local cache, the downstream server forwarding the message only if the object associated with the requested content is not stored in the local cache.

11. A network device comprising:
a communication interface configured to receive a message, forwarded by a downstream server, from a client;
at least one processor configured to determine whether the message includes a cookie associated with the client, and to include the cookie in a read-ahead request if the cookie is supported by a content server;
wherein the processor is further configured to cause the network device to retrieve content including an Hypertext Markup Language (HTML) page specifying an object from a content server based on the read-ahead request and the cookie, and to forward the object over a communications link to the downstream server based on a predetermined criteria relating to the object, including time-to-live of the object and the object being marked as uncacheable, prior to the client transmitting a message requesting the object.

12. A network device according to claim 11, wherein the communications link includes at least one of a plurality of Transmission Control Protocol (TCP) connections to support parallel Hypertext Transfer Protocol (HTTP) transactions, and a multiplexed connection of HTTP transactions.

13. A network device according to claim 11, wherein the communications link is established over a data network that includes at least one of a Very Small Aperture Terminal (VSAT) satellite network, and a terrestrial wide area network (WAN).

14. A network device according to claim 11, wherein the object is retrieved and multicast to the downstream server.

15. A network device according to claim 11, wherein the processor is further configured to cause the network device to forward to the downstream server a list specifying expected objects corresponding to the content, wherein the downstream server blocks requests from the client for objects on the list.

16. A network device according to claim 11, wherein the processor is further configured to determine whether the object is cacheable, wherein the object is forwarded if the object is cacheable.

17. A device according to claim 11, wherein the downstream server explicitly tracks objects stored in a local cache, the downstream server forwarding the message only if the object associated with the requested content is not stored in the local cache.

18. A non-transitory computer-readable storage medium carrying one or more sequences of one or more instructions for providing content to a client, the one or more sequences of one or more instructions including instructions which, when executed by one or more processors, cause the one or more processors to perform the steps of:
receiving a message, forwarded by a downstream server, from the client;
determining whether the message includes a cookie associated with the client;
including the cookie in a read-ahead request if the cookie is supported by a content server;
retrieving the content including an Hypertext Markup Language (HTML) page specifying an object based on the read-ahead request based on the cookie; and
forwarding the object over a communications link to the downstream server based on a predetermined criteria relating to the object, wherein the predetermined criteria includes time-to-live of the object and the object being marked as uncacheable, prior to the client transmitting a message requesting the object.

19. A non-transitory computer-readable medium according to claim 18, wherein the communications link in the transmitting step includes at least one of plurality of Transmission Control Protocol (TCP) connections to support parallel Hypertext Transfer Protocol (HTTP) transactions, and a multiplexed connection of HTTP transactions.

20. A non-transitory computer-readable medium according to claim 18, wherein the communications link in the transmitting step is established over a data network that includes at least one of a Very Small Aperture Terminal (VSAT) satellite network, and a terrestrial wide area network (WAN).

21. A non-transitory computer-readable medium according to claim 18, wherein the one or more processors further perform the step of:
retrieving the object; and
multicasting the object to the downstream server.

* * * * *